Figure 1:
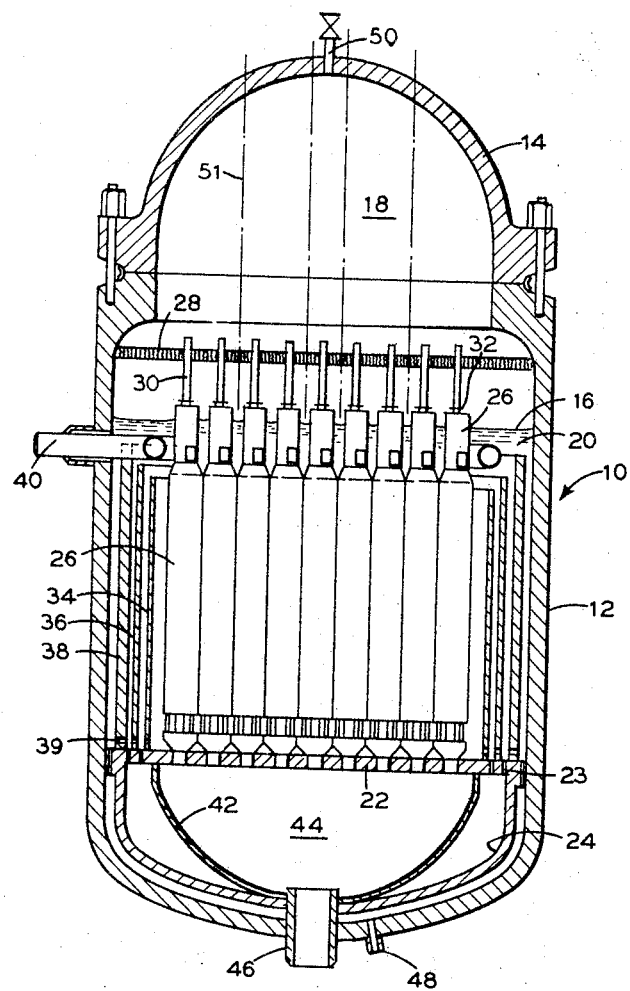

INVENTOR.
Johannes H. Ammon

July 11, 1967  J. H. AMMON  3,330,097
VAPOR LIQUID SEPARATOR
Original Filed Dec. 1, 1960
2 Sheets-Sheet 2
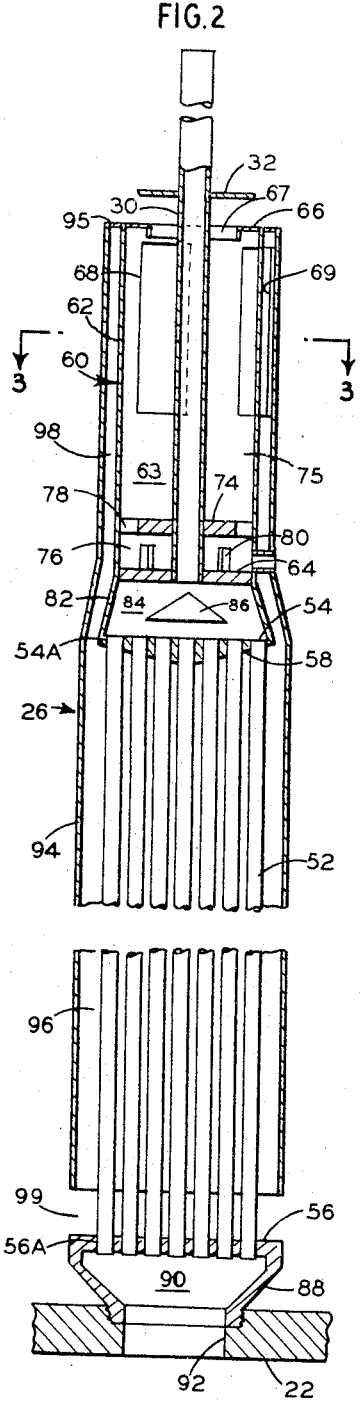
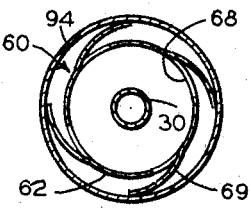
*INVENTOR.*
Johannes H. Ammon

United States Patent Office 3,330,097
Patented July 11, 1967

3,330,097
VAPOR LIQUID SEPARATOR
Johannes H. Ammon, Akron, Ohio, assignor to The Babcock & Wilcox Company, New York, N.Y., a corporation of New Jersey
Original application Dec. 1, 1960, Ser. No. 72,958, now Patent No. 3,185,630, dated May 25, 1965. Divided and this application May 21, 1965, Ser. No. 457,603
2 Claims. (Cl. 55—204)

This application is a division of copending application No. 72,958 filed Dec. 1, 1960, which issued as U.S. Patent No. 3,185,630 on May 25, 1965.

This invention relates in general to vapor-liquid separators and, more particularly, to cyclone type separators each having its own vapor-liquid mixture inlet passageway.

Many present day vapor generators are sub-divided into separate vapor generating sections. For efficient operation each section is provided with its own vapor-liquid separator. Typical of such units are boiling water reactors in which the fuel element assemblies form the individual vapor generating sections. Such individual separators may also be utilized as secondary separating means arranged to receive the outlet vapor from a primary separator. By employing cyclone separators for secondary separation the amount of liquid carry-over in the separated vapor can be virtually eliminated.

Accordingly, the present invention provides a cyclone or whirl chamber type separator having its own vapor-liquid inlet passageway. In the prior art a plurality of cyclone separators were usually arranged to receive the vapor-liquid mixture from a common inlet passageway, each separator did not have its own inlet passageway. In the present invention vanes are arranged in the inlet passageway to direct the vapor-liquid mixture in a whirling flow path into the separator chamber. The centrifugal forces set up by the whirling flow path drive the heavier liquid fraction against the chamber wall while the lighter vapor fraction flows centrally upward. The vapor is discharged through an outlet in the upper end of the chamber and the liquid flows downwardly along the wall to an outlet near the lower end of the chamber. A partition provides a liquid outlet plenum in the base of the chamber and ducts are arranged to carry the separated liquid from this plenum through the inlet passageway.

The various features of novelty which characterize my invention are pointed out with particularitly in the claims annexed to and forming a part of this specification. For a better understanding of the invention, its operating advantages and specific objects attained by its use, reference should be had to the accompanying drawings and descriptive matter in which I have illustrated and described a preferred embodiment of the invention.

Of the drawings:

FIG. 1 is a vertical cross-sectional view of a reactor vessel embodying the present invention, FIG. 2 is an enlarged partial vertical cross-sectional view of a fuel element assembly illustrated in FIG. 1, and FIG. 3 is a cross-sectional view taken along line 3—3 in FIG. 2.

In FIG. 1 there is shown a boiling coolant reactor 10 incorporating the present invention. The reactor 10 comprises a reactor pressure vessel 12 with a bolted closure member 14. The interior of the reactor is divided into an upper vapor space 18 and a lower liquid space 20 defined by the positioning of the coolant liquid level 16. A horizontally arranged support plate 22 extends across the lower part of the reactor liquid space and has a number of orifices 23 adjacent to its periphery. Throughout its periphery it is connected to a lower thermal shield 24 which is spaced adjacent the lower or base portion of the reactor vessel 12.

Within the vessel a number of fuel element assemblies 26 of material fissionable by neutrons of thermal energy are fitted into the support plate 22 and extend upwardly through the liquid space 20 and on into the vapor space 18, terminating a short distance above the normal coolant liquid level 16. Each of said fuel element assemblies 26 includes a conduit 30 in communication with the vapor space 18 which extending downwardly, passes through a horizontally positioned scrubber 28 and is secured within the fuel element assembly. A deflector plate 32, disposed about each of the conduits 30, is located in the space between the scrubber 28 and the top of each of the fuel element assemblies 26. The scrubber 28 is placed above the normal water level 16 and extends across the total cross sectional flow area of the reactor 10.

The fuel element assemblies 26 are enclosed by three concentrically arranged cylindrically shaped thermal shields 34, 36, and 38 which extend upwardly from the support plate 22 the requisite distances above the fuel element assemblies to provide the necessary shielding effect. A number of circumferentially spaced horizontally extending orifices 39 are located near the lower ends of the thermal shields 34, 36 and 38. A ring shaped coolant inlet header 40 within the liquid space 20 encircles the fuel element assemblies.

In the lower part of the liquid space 20 a generally hemispherical, suitably insulated plate 42, attached about its peripheral edge to the support plate 22, forms a superheated vapor collection chamber 44. A superheated vapor outlet nozzle 46 extends from the collection chamber 44 through the lower thermal shield 24 and the base of the reactor 12 to the exterior of the vessel. There is also a drain connection 48 located in the lower head of the reactor vessel 12 for draining the space between the lower portion of the reactor vessel and the thermal shield 24. A valved vent connection 50 opening into the vapor space 18 is located in the closure member 14.

In FIG. 1 the location of control rods 51 is generally indicated by center-lines.

In the embodiment of the fuel element assembly 26 shown in FIG. 2 the fuel is contained within a plurality of vertically extending tubular fuel elements 52 disposed in spaced parallel relationship and extending between an upper tube sheet 54 and a lower tube sheet 56. The tubular fuel elements 52 are arranged in a triangular lattice and form a bundle of circular cross-section with the ends of the fuel elements fitted into tube seats 54A, 56A in the upper and lower tube sheets 54, 56 respectively. The lower face 58 of the upper tube sheet 54 is inclined upwardly from its centerpoint to direct the coolant flow outwardly toward its periphery.

A vapor-liquid cyclone type separator 60 is positioned above and in axial alignment with the bundle of tubular fuel elements 52. Vertically extending walls 62 form a cylindrically shaped hollow whirl chamber 63 closed at its lower end by plate 64 and having an annular shaped plate 66 disposed across its upper end to form a centrally positioned vapor outlet 67. A number of inlet openings 68, circumferentially spaced in the wall 62, admit a vapor-liquid mixture into the whirl chamber 63. Each of the inlet openings 68 has a corresponding vertically extending vane 69 connected along one of its vertical edges to one side of the inlet opening, with its other vertical edge spaced outwardly from the wall 62. The vanes 69 are curved in a horizontal plane so that the concave side of each vane faces inwardly toward its corresponding inlet opening 68. These vanes are arranged to provide substantially tangential entry of the vapor-liquid mixture into the whirl chamber 63.

The whirl chamber 63 is divided by a horizontally arranged partition 74 into an upper whirl space 75 and a lower liquid outlet space 76. Openings 78 circumferentially spaced in partition 74 permit flow of separated liquid from the whirl space 75 to the liquid space 76. Circumferentially spaced liquid outlet passageways 80 extend outwardly from the wall 62 to permit discharge of liquid from the liquid space 76 to the liquid space 20, see FIG. 1.

The conduit 30 passes centrally through the separator 60 with its lower or outlet end fitting into and extending through the plate 64 and its upper or inlet end located above the top of the separator. A horizontally arranged ring shaped vapor deflector plate 32 encircles the conduit 30 directly above the vapor outlet 67.

Vertically arranged, frusto-conically shaped wall section 82 is connected around its top edge to the base of the separator 60 and about its bottom edge to the upper tube sheet 54 and forms in combination therewith a vapor inlet chamber 84. The vapor conduit 30 opens into this chamber 84 and the tubular fuel elements 52, which extend through the upper tube sheet 54, also open into this chamber. In the chamber 84 a conically shaped deflector baffle 86 is positioned with its apex directed upwardly and in axial alignment with the conduit 30.

At the lower end of the fuel element assembly a frusto-conically shaped wall 88 is connected to the lower tube sheet 56 and extends downwardly to form, in combination with the tube sheet, a vapor outlet chamber 90. The lower end of the wall 88 is threaded about its outer face for connection into the threaded portion of support plate 22. The lower ends of the tubular fuel elements 52 discharge into the vapor outlet chamber 90 which in turn communicates with the vapor collection chamber 44 through openings 92 in the support plate 22.

As shown in FIG. 2 a vertically disposed, cylindrically shaped wall 94 extends from a horizontal plate spaced a short distance above the lower tube sheet 56 upwardly to the top of the separator 60. At its upper edge, the wall 94 is connected to the separator 60 by means of a ring shaped plate section 95. This wall 94 is spaced from the tubular fuel elements 52 and also from the separator wall 62 to form a riser chamber 96 about the tubular fuel elements 52 and a cooperating annular shaped passageway 98 about the separator. This passageway is closed at the top by the plate section 95. The space between the lower end of the wall 94 and the lower tube sheet 56 forms a coolant inlet opening 99 to the riser chamber 96.

In operation the liquid coolant is heated in its passage through the riser chamber 96 until it boils, and then the vapor-liquid mixture flows upward through the annular passageway 98 where it is directed by vanes 69 through inlet openings 68 into the separator 60. The vanes 69 extend outwardly across the passageway 98 to the walls 94 and cause the coolant to enter the separator 60 substantially tangential to the wall 62, producing a cyclonic effect to promote separation of the vapor from the liquid. The separated vapor portion passes upwardly through the vapor outlet 67 and into the vapor space 18. As the vapor portion exits from the separator it is directed against the deflector plate 32 which provides an additional vapor-liquid separation effect.

The liquid portion of the coolant flows downwardly within the whirl space 75, through the openings 78 in the partition 74 and into the liquid space 76, from whence it flows through the outlet passageways 80 and back into the liquid space 20 where it mixes with the make-up coolant from the header 40 prior to its return to inlet 99 for passage through the fuel element assembly. The make-up coolant is supplied to compensate for the coolant liquid which has been converted into vapor, thus maintaining a substantially constant volume of coolant liquid in the vessel.

After discharge from the separator the vapor portion continues its upward flow within the vapor space 18, passing through the vapor scrubber 28 wherein the residual entrained liquid is separated out. While the reactor is shown with a scrubber, it is not a necessary element since separation within the reactor may be satisfactorily accomplished using the separators only. Closely spaced above the top of the scrubber 28 is the inlet to the conduit 30 which serves to carry the vapor downwardly into the vapor inlet chamber 84, for distribution into the tubular elements. In flowing therethrough the saturated vapor is superheated.

While the separator has been described in combination with a fuel element assembly it will be appreciated that it may be employed in a number of other ways, one of which is as a secondary separator to receive separated vapor from a primary separator.

While in accordance with the provisions of the statutes I have illustrated and described herein the best form of the invention now known to me, those skilled in the art will understand that changes may be made in the form of apparatus disclosed without departing from the spirit of the invention covered by my claims, and that certain features of my invention may be sometimes used to advantage without a corresponding use of other features.

What is claimed is:

1. A vapor-liquid separator comprising first wall means including a side wall forming an upwright hollow whirl chamber having a number of vapor-liquid inlet openings in said side wall, a separated vapor outlet from the upper end of said chamber and a plate closing the bottom of said chamber, a partition extending across the lower end of said whirl chamber above said bottom closing plate and dividing the whirl chamber into an upper separating space and a lower liquid outlet space connected thereto, plate means spaced outwardly from and laterally enclosing said side wall of said chamber and forming in combination therewith an annular shaped inlet passageway extending below said lower liquid outlet space and open at its lower end, a vertically arranged vapor-liquid conduit opening to said inlet passageway open end, annular plate means extending from said wall means to said plate means forming a closure for the upper end of said passageway, a vertically extending vane positioned in said inlet passageway at each of said inlet openings in said side walls, each of said vanes attached along one edge to said side wall at an inlet opening therethrough and extending outwardly in a uniformly curved formation throughout its height across the inlet passageway to the inside face of said plate means for directing a vapor-liquid mixture into said whirl chamber, the surface of said vanes facing said inlet openings having a concave configuration in a horizontal plane and forming with said side wall vertically unobstructed passages there-between, and duct means connected to the liquor outlet space in said whirl chamber and extending outwardly across said annularly shaped inlet passageway to conduct separated liquid exteriorly of said plate means.

2. A vapor-liquid separator comprising wall means including a cylindrical side wall forming an upright hollow whirl chamber having a number of vapor-liquid inlet openings in said side wall, a separated vapor outlet in the top of said chamber and a plate closing the bottom of said chamber, a lip at said vapor outlet depending into said chamber, a partition extending across the lower end of said whirl chamber above said bottom closing plate and dividing the whirl chamber into an upper separating space and a lower liquid outlet space connected thereto, said partition having openings therethrough about its outer periphery for admitting separated liquid from said separating space into said liquid outlet space, concentrically arranged plate means spaced outwardly from and laterally enclosing said side wall of said chamber and forming in combination therewith an annular shaped inlet passageway extending below said lower liquid outlet space and open at its lower end, a vertically arranged vapor-liquid conduit opening to said inlet passageway open end, annular plate means extending from the upper end of said wall means to the upper end of said plate means forming a closure for the upper end of said passageway, and a vertically extending vane positioned in said inlet passageway at each of said inlet openings in said side wall, each of said vanes attached along one vertical edge to said side wall at an inlet opening therethrough and extending outwardly in a uniformly curved formation throughout its height across the passageway to said plate means, the surface of said vanes facing said inlet openings having a concave configuration in a horizontal plane and forming with said side wall vertically unobstructed passages therebetween, duct means connected to the liquid outlet space in said chamber and extending outwardly across said annularly shaped inlet passageway to conduct separated liquid exteriorly of said plate means, and a centrally located vertically extending vapor conduit passing axially through said whirl chamber from a point above to a point below said separator.

References Cited
FOREIGN PATENTS
522,114   6/1940   Great Britain.

REUBEN FRIEDMAN, *Primary Examiner.*

R. BURKS, *Assistant Examiner.*